United States Patent
Wingett et al.

(10) Patent No.: US 7,607,611 B2
(45) Date of Patent: Oct. 27, 2009

(54) FLIGHT CONTROL SURFACE ACTUATION SYSTEM WITH REDUNDANTLY CONFIGURED AND LOCKABLE ACTUATOR ASSEMBLIES

(75) Inventors: Paul T. Wingett, Mesa, AZ (US); Calvin C. Potter, Mesa, AZ (US); Casey Hanlon, Queen Creek, AZ (US); Dwayne M. Benson, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 288 days.

(21) Appl. No.: 11/192,625

(22) Filed: Jul. 28, 2005

(65) Prior Publication Data

US 2007/0018040 A1 Jan. 25, 2007

Related U.S. Application Data

(60) Provisional application No. 60/680,073, filed on May 11, 2005.

(51) Int. Cl.
B64C 13/14 (2006.01)

(52) U.S. Cl. ..................... 244/99.3; 244/224

(58) Field of Classification Search ............... 244/75.1, 244/99.2, 99.3, 212–215, 220, 221, 99.4, 244/224
See application file for complete search history.

(56) References Cited

U.S. PATENT DOCUMENTS

| | | | |
|---|---|---|---|
| 1,861,318 A * | 5/1932 | Page ........................... 244/211 |
| 2,665,084 A | 1/1954 | Feeney et al. |
| 3,401,600 A * | 9/1968 | Wood ........................... 91/44 |
| 3,426,650 A * | 2/1969 | Jenney ..................... 91/216 R |
| 3,949,958 A | 4/1976 | Richter |
| 4,470,569 A | 9/1984 | Shaffer et al. |
| 4,498,647 A | 2/1985 | Boehringer et al. |
| 4,688,744 A | 8/1987 | Aldrich |
| 4,715,567 A * | 12/1987 | Poccard ..................... 244/213 |
| 4,759,515 A | 7/1988 | Carl |
| 4,800,798 A | 1/1989 | Boldrin et al. |
| 4,905,933 A | 3/1990 | Ako |
| 4,964,599 A * | 10/1990 | Farineau ................... 244/195 |
| 5,493,497 A * | 2/1996 | Buus ............................ 701/4 |
| 6,062,262 A * | 5/2000 | Tash ............................ 138/89 |
| 6,116,065 A * | 9/2000 | Hale ........................... 70/200 |
| 6,755,375 B2 * | 6/2004 | Trikha ....................... 244/99.4 |
| 6,776,376 B2 | 8/2004 | Collins |
| 6,860,452 B2 * | 3/2005 | Bacon et al. .............. 244/194 |
| 2004/0075019 A1 | 4/2004 | Collins |
| 2005/0051671 A1 | 3/2005 | Djuric |
| 2005/0116095 A1 | 6/2005 | Cline et al. |

* cited by examiner

FOREIGN PATENT DOCUMENTS

EP 0 237 650 A1 9/1987

OTHER PUBLICATIONS

European Search Report, Sep. 1, 2006.

*Primary Examiner*—Tien Dinh
(74) *Attorney, Agent, or Firm*—Ingrassia Fisher & Lorenz, P.C.

(57) ABSTRACT

A flight control surface actuator assembly includes a pair of flight control surface actuators and a pivot arm. One of the flight control surface actuators is coupled to a flight control surface and a static airframe structure, the other flight control surface actuator is coupled to the flight control surface and the pivot arm. The pivot arm coupled to the static airframe structure and is configured to pivot relative to the second flight control surface actuator and the static airframe structure.

18 Claims, 3 Drawing Sheets

FLIGHT CONTROL SURFACE ACTUATION SYSTEM WITH REDUNDANTLY CONFIGURED AND LOCKABLE ACTUATOR ASSEMBLIES

CROSS-REFERENCES TO RELATED APPLICATIONS

This application claims the benefit of U.S. Provisional Application No. 60/680,073 filed May 11, 2005.

TECHNICAL FIELD

The present invention relates to flight control surface actuation and, more particularly, to a flight control surface actuation system that includes a redundancy mechanism.

BACKGROUND

Aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw, and roll axes, and the secondary flight control surfaces are those that are used to influence the lift or drag (or both) of the aircraft. Although some aircraft may include additional control surfaces, the primary flight control surfaces typically include a pair of elevators, a rudder, and a pair of ailerons, and the secondary flight control surfaces typically include a plurality of flaps, slats, and spoilers.

The positions of the aircraft flight control surfaces are typically controlled using a flight control surface actuation system. The flight control surface actuation system, in response to position commands that originate from either the flight crew or an aircraft autopilot, moves the aircraft flight control surfaces to the commanded positions. In most instances, this movement is effected via actuators that are coupled to the flight control surfaces. Though unlikely, it is postulated that a flight control surface actuator could become inoperable. Thus, some flight control-surface actuation systems are implemented with a plurality of actuators coupled to a single flight control surface.

Although flight control surface actuation systems, such as the one generally described above, operate safely, reliably, and robustly, these systems can suffer certain drawbacks. For example, for some types of actuators, if the actuator is rendered inoperable, the remaining actuators that are coupled to the same flight control surface may not be able to move the flight control surface sufficiently to compensate for the inoperability. The inoperable actuator may therefore prevent, or at least inhibit, movement of the flight control surface. If the flight control surface is in a position other than in a neutral position during such an event, the aircraft may be difficult to handle.

Hence, there is a need for a system and method that will not prevent or inhibit an actuator from moving a flight control surface in the unlikely event that another actuator that is coupled to the same flight control surface becomes inoperable. The present invention addresses at least his need.

BRIEF SUMMARY

The present invention provides a flight control surface actuation system redundancy mechanism that allows one or more actuators to effect full and continued flight control surface movement in the unlikely event that one or more additional actuators that are coupled to the same flight control surface become inoperable.

In one embodiment, and by way of example only, a flight control surface actuator assembly includes a first flight control surface actuator, a second flight control surface actuator, and a pivot arm. The first flight control surface actuator is adapted to couple to a flight control surface and a static airframe structure, and is further adapted to receive a drive force and is operable, upon receipt thereof, to move between at least an extended position and a retracted position. The second flight control surface actuator is adapted to couple to the flight control surface, and is further adapted to receive a drive force and is operable, upon receipt thereof, to move between at least an extended position and a retracted position. The pivot arm is rotationally coupled to, and configured to pivot relative to, the second flight control surface actuator, and is adapted to be rotationally coupled to, and configured to pivot relative to, a static airframe structure.

In another exemplary embodiment, a flight control surface actuation system includes a movably mounted flight control surface, a first flight control surface actuator, a second flight control surface actuator, and a pivot arm. The first flight control surface actuator is coupled to the flight control surface and a static airframe structure, and is adapted to receive a drive force and is operable, upon receipt thereof, to move the flight control surface between at least an extended position and a retracted position. The second flight control surface actuator is coupled to the flight control surface actuator, and is adapted to receive a drive force and is operable, upon receipt thereof, to move the flight control surface between at least an extended position and a retracted position. The pivot arm is rotationally coupled to, and configured to pivot relative to, the second flight control surface actuator and the static airframe structure.

In yet another exemplary embodiment, a flight control surface actuation system includes an actuator controller, first and second drive force control units, first and second flight control surface actuators, a pivot arm, and a pivot arm lock. The actuator controller is adapted to receive flight control surface position commands and is operable, in response thereto, to supply actuator position commands. A first drive force control unit is coupled to receive the actuator position commands and is operable, upon receipt thereof, to supply a first drive force. The second drive force control unit is coupled to receive the actuator position commands and is operable, upon receipt thereof, to supply a second drive force. The first flight control surface actuator is adapted to couple to a flight control surface and a static airframe structure, and is coupled to receive the first drive force and is operable, upon receipt thereof, to move between at least an extended position and a retracted position. The second flight control surface actuator is adapted to couple to the flight control surface, and is coupled to receive the second drive force and is operable, upon receipt thereof, to move between at least an extended position and a retracted position. The pivot arm is rotationally coupled to, and configured to pivot relative to, the second flight control surface actuator and the static airframe structure. The pivot arm lock is movable between a locked position, in which the pivot arm lock prevents rotation of the pivot arm and, and an unlocked position, in which the pivot arm lock does not prevent rotation of the pivot arm.

Other independent features and advantages of the preferred flight control surface actuator assembly and system will become apparent from the following detailed description, taken in conjunction with the accompanying drawings which illustrate, by way of example, the principles of the invention.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background or the following detailed description.

Figure 1:
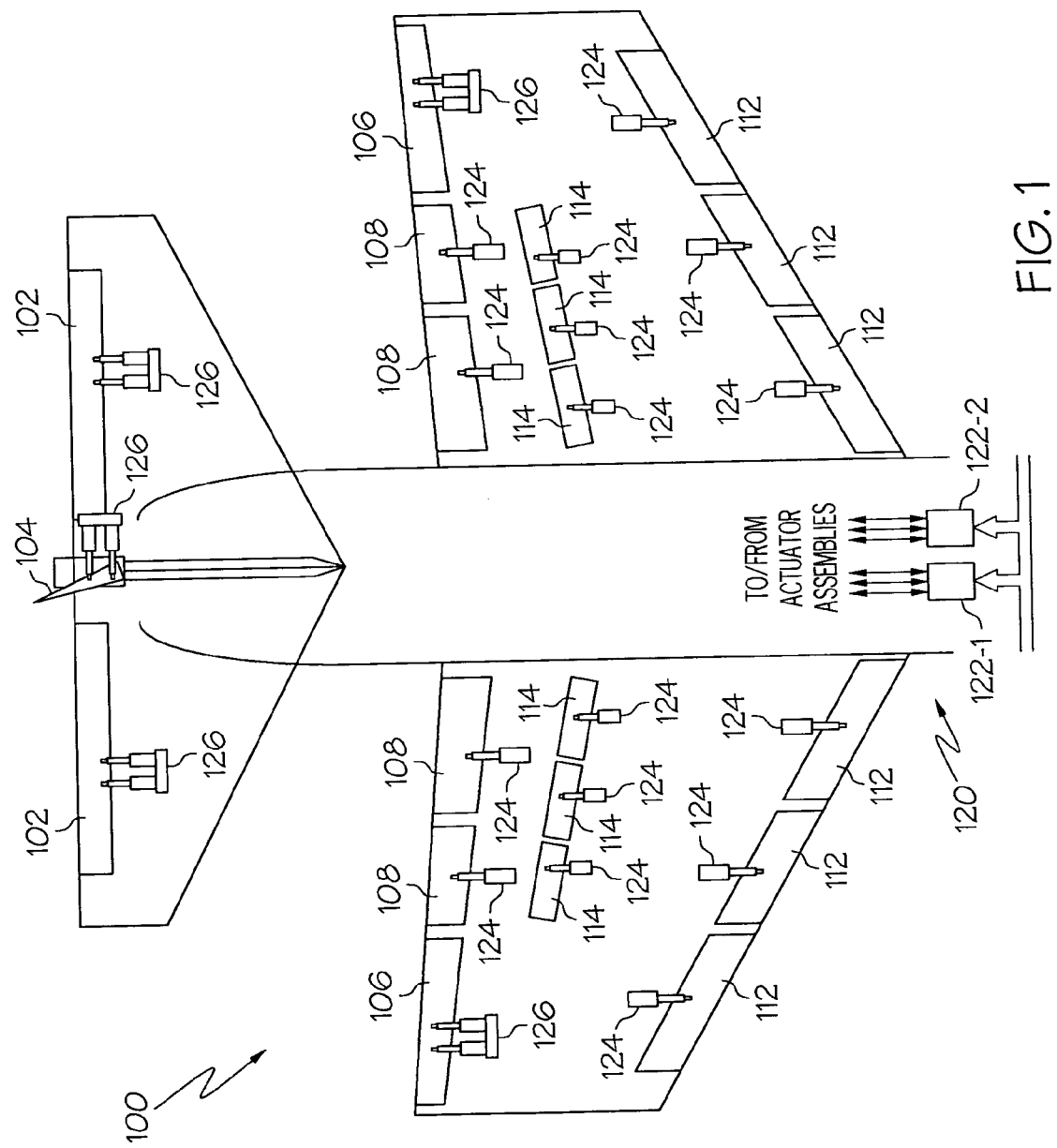
FIG. 1 is a schematic diagram of a portion of an exemplary embodiment of an aircraft depicting an embodiment of an exemplary flight control surface actuation system.

Turning first to FIG. 1, a schematic diagram of a portion of an exemplary aircraft and an exemplary flight control surface actuation system is shown. In the illustrated embodiment, the aircraft 100 includes a pair of elevators 102, a rudder 104, and a pair of ailerons 106, which are the primary flight control surfaces, and a plurality of flaps 108, slats 112, and spoilers 114, which are the secondary flight control surfaces. The primary flight control surfaces 102-106 control aircraft movement about the aircraft pitch, yaw, and roll axes. Specifically, elevators 102 are used to control aircraft movement about the pitch axis, the rudder 104 is used to control aircraft movement about the yaw axis, and the ailerons 106 control aircraft movement about the roll axis. It is noted, however, that aircraft movement about the yaw axis can also be achieved either by banking the aircraft or by varying the thrust levels from the engines on opposing sides of the aircraft 100.

The secondary control surfaces 108-114 influence the lift and drag of the aircraft 100. For example, during aircraft take-off and landing operations, when increased lift is desirable, the flaps 108 and slats 112 may be moved from retracted positions to extended positions. In the extended position, the flaps 108 increase both lift and drag, and enable the aircraft 100 to descend more steeply for a given airspeed, and also enable the aircraft 100 get airborne over a shorter distance. The slats 112, in the extended position, increase lift, and are typically used in conjunction with the flaps 108. The spoilers 114, on the other hand, reduce lift and when moved from retracted positions to extended positions, which is typically done during aircraft landing operations, may be used as air brakes to assist in slowing the aircraft 100.

The flight control surfaces 102-114 are moved between retracted and extended positions via a flight control surface actuation system 120. The flight control surface actuation system 120 includes one or more actuator controllers 122 and a plurality of primary and secondary flight control surface actuator assemblies 124 and 126. It will be appreciated that the number of actuator controllers 122 may vary. However, in the depicted embodiment, the flight control surface actuation system 120 includes two multi-channel actuator controllers 122 (122-1, 122-2).

The system 120 and actuator controllers 122-1, 122-2 may be implemented according to any one of numerous operational configurations. For example, the system 120 could be configured such that one of the controllers 122-1 (122-2) is an active controller, while the other controller 122-2 (122-1) is in an inactive (or standby) mode. Alternatively, the system 120 could be configured such that both controllers 122-1, 122-2 are active and controlling all, or selected ones, of the flight control surface actuator assemblies 124, 126. No matter the specific configuration, each controller 122-1, 122-2, when active, receives flight control surface position commands from one or more non-illustrated external systems, such as a flight control computer or pilot controls. In response to the flight control surface position commands, the active controllers 122-1, 122-2 supply actuator position command signals to the appropriate flight control surface actuator assemblies 124, 126. The flight control surface actuator assemblies 124, 126, in response to the position command signals, move the appropriate flight control surfaces 102-114 to the commanded flight control surface position.

The controllers 122-1, 122-2 also receive monitor signals that are representative of flight control surface actuator assembly 124, 126 operability. The controllers 122-1, 122-2, based on these monitor signals, determine the operability of the flight control surface actuator assemblies 124, 126. If one or both controllers 122-1, 122-2 determines that a primary flight control surface actuator assembly 126 is partially inoperable, it automatically compensates, if necessary, the actuator position commands supplied to that actuator assembly 126 for the partial inoperability. It will be appreciated that the monitor signals that the controllers 122-1, 122-2 receive may be supplied directly from the flight control surface actuator assemblies 124, 126, or from other systems and components such as, for example, non-illustrated flight surface position sensors.

The flight control surface actuation system 120 may also be implemented using various numbers and types of flight control surface actuator assemblies 124, 126. In addition, the number and type of flight control surface actuator assemblies 124, 126 per control surface 102-114 may be varied. In the depicted embodiment, the system 120 is configured such that a single, non-redundant actuator assembly 124 is coupled to each of the secondary flight control surfaces 108-114, and a single, redundant actuator assembly 126, embodiments of which are described in more detail further below, is coupled to each of the primary flight control surfaces 102-106.

Before proceeding further, it is noted that the embodiment depicted in FIG. 1 and described above is merely exemplary, and that the flight control surface actuation system 120 could be implemented in any one of numerous alternative configurations. For example, the system 120 could be configured such that two or more non-redundant actuator assemblies 124 are coupled to each, or selected ones, of the secondary flight control surfaces 108-114. The system 120 could also be configured such that one or more redundant actuator assemblies 126 are coupled to one or more of the secondary flight control surfaces 108-114, in addition to, or instead of, the single non-redundant actuator assemblies 124. Moreover, the system 120 could be configured such that two or more redundant actuator assemblies 126 are coupled to each, or selected ones, of the primary flight control surfaces 102-106.

No matter the specific number and type of non-redundant actuator assemblies 124 that are used, a more detailed description of the structure and function of the non-redundant actuator assembly 124 is not needed to fully enable or describe the claimed invention. As such, no further description thereof is included herein. However, as was noted above, descriptions of various embodiments of the redundant flight control surface actuator assembly 126 are included, and with reference to FIGS. 2-4, will now be provided.

Figure 2:
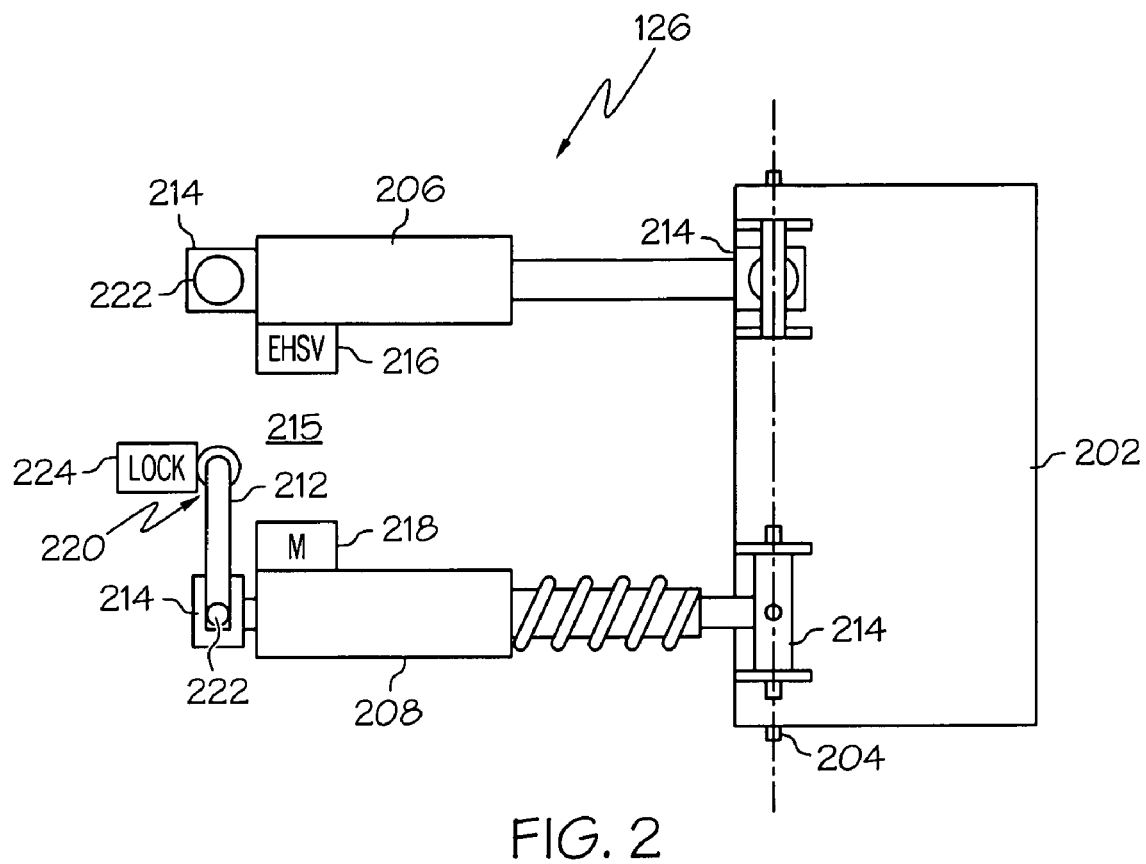
FIGS. 2 and 3 are schematic representations of an exemplary embodiment of a redundant flight control surface actuator assembly coupled to a flight control surface, and that may be used in the flight control surface actuation system of the aircraft of FIG. 1.
Figure 3:
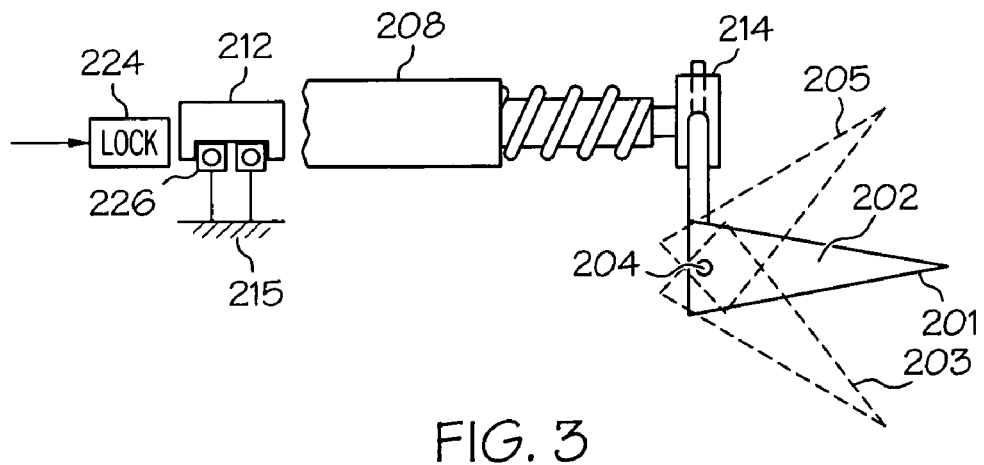
Figure 4:
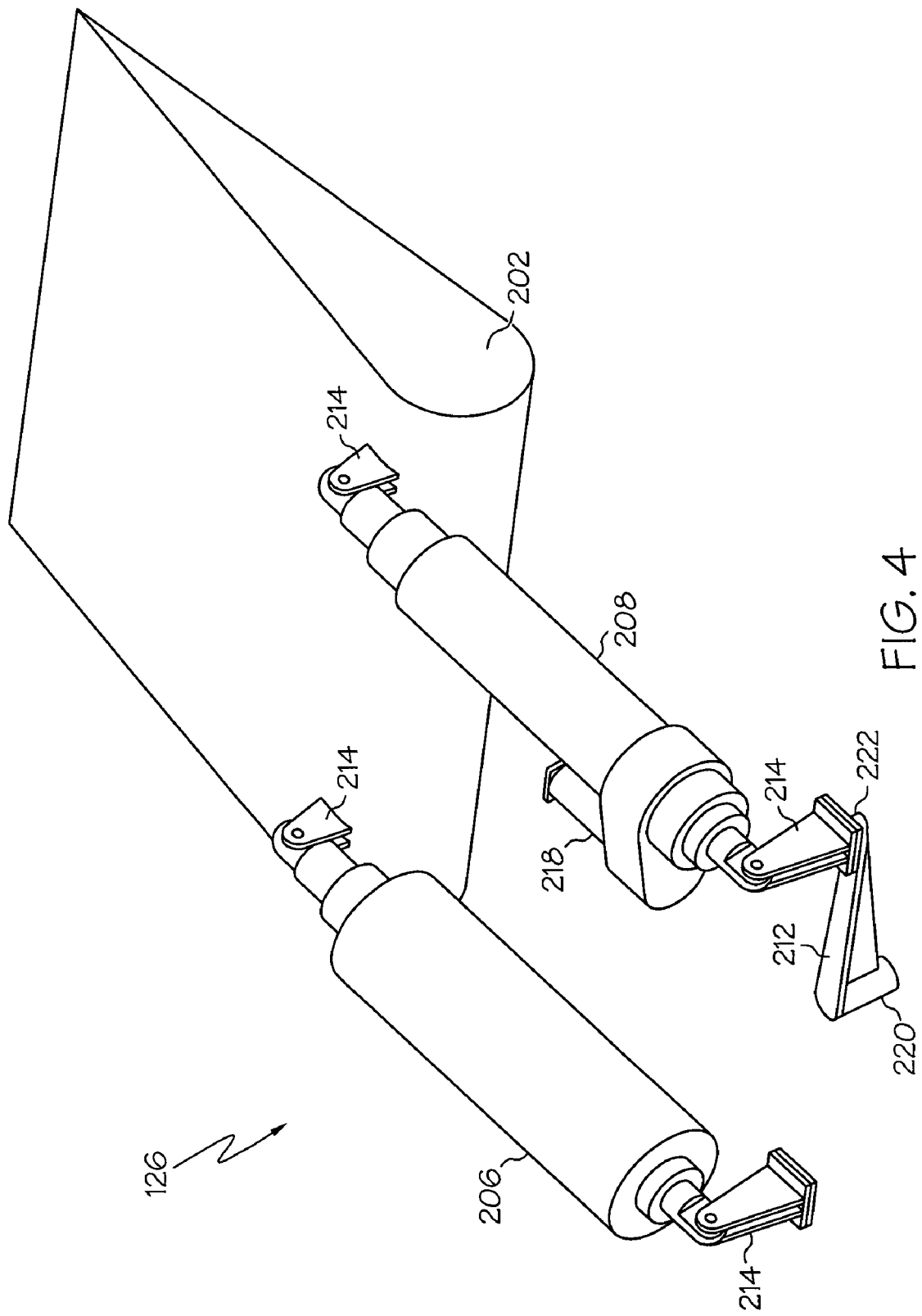
FIG. 4 is a perspective view of an exemplary physical implementation of the exemplary redundant flight control surface actuator assembly shown in FIGS. 2 and 3.

A schematic representation of an embodiment one of the redundant flight control surface actuator assemblies 126 coupled to a flight control surface 202 is shown in FIGS. 2 and 3, and a representative physical embodiment thereof is shown in FIG. 4. For the aircraft 100 depicted in FIG. 1, the flight control surface 202 shown in FIGS. 2-4 represents one of the primary flight control surfaces 102-106. However, as was mentioned above, the flight control surface 202 could, for other flight control surface actuation system 120 embodiments, also represent any one of the secondary flight control surfaces 108-114. No matter the specific flight control surface 202 that FIGS. 2-4 represent, it is seen that, at least in the depicted embodiment, the flight control surface 202 is configured to rotate about a pivot axis 204. In this regard, it is noted that the flight control surface 202 can be rotated, via the redundant flight control surface actuator assembly 126, from a neutral position 201 to various pivot positions between an extended position 203 and a retracted position 205. It will be appreciated that the flight control surface 202 could be configured to translate, rather than rotate, between extended and retracted positions.

The redundant flight control surface actuator assembly 126 includes two actuators—a first actuator 206 and a second actuator 208—and a pivot arm 212. The two actuators 206, 208 are each coupled, via suitable coupling devices 214, to the flight control surface 202. However, only the second actuator 208 is coupled, also via a suitable coupling device 214, to the pivot arm 212. It will be appreciated that the depicted configuration is merely exemplary, and that the first actuator 206 could instead be coupled to the pivot arm 212, and the second actuator 208 could instead be coupled to the static airframe structure 215. The coupling devices 214, which may be implemented using any one of numerous types of mounts and/or bearing assemblies, are preferably configured to provide each actuator 206, 208 at least two rotational degrees-of-freedom. Some non-limiting examples of suitable bearing assemblies include any one of numerous types of gimbal bearing assemblies or any one of numerous types of spherical bearing assemblies.

The actuators 206, 208 may be each implemented using any one of numerous types of actuators including, for example, electromechanical actuators, hydraulic actuators, electro-hydraulic actuators, pneumatic actuators, electro-pneumatic actuators, or various combinations thereof. In the depicted embodiment, however, the first actuator 206 is implemented a hydraulic actuator, and the second actuator 208 is implemented as an electromechanical actuator. In addition, each actuator 206, 208 is preferably configured for double-stroke and full-load capability. Thus, in the unlikely event one of the actuators 206 or 208 becomes inoperable, the remaining actuator 208 or 206 can be used to provide full functionality.

No matter the specific types (or type) of actuators that are used, each actuator 206, 208, upon receipt of a drive force, is moveable between an extended position and a retracted position, and may be positioned to any one of numerous positions between the extended and retracted positions. In the depicted embodiment, the positions to which the actuators 206, 208 are moveable correspond to the neutral 201, extended 203, and retracted 205 positions of the flight control surface 202. It will be appreciated that the flight control surface extended 203 and retracted 205 positions correlate to actuator positions in which the actuators 206, 208 extend and retract, respectively, past neutral actuator positions. It will additionally be appreciated that the neutral actuator position can be any position between a fully extended actuator position and a fully retracted actuator position, and does not necessarily correspond to an actuator position that is at the midpoint of the actuator 206, 208 operational range. Preferably, the actuators 206, 208 are infinitely adjustable between the extended, neutral, and retracted actuator positions and can be continuously modulated during flight to optimize the position of the flight control surface 202 during flight.

The actuators 206, 208, as was previously noted, move between the extended and retracted actuator positions upon receipt of a drive force. In the depicted embodiment, the drive force is controllably supplied to each of the actuators 206, 208 via first and second drive force control units 216 and 218. As with the actuators 206, 208, the drive force control units 216, 218 may be implemented using any one of numerous types of devices and in any one of numerous configurations, which will typically depend on the type of actuator 206, 208 with which each unit 216, 218 is associated. In the depicted embodiment, in which the first actuator 206 is a hydraulic actuator and the second actuator 208 is an electromechanical actuator, the first drive force control unit 216 (not shown in FIG. 4) is a hydraulic fluid control valve and the second drive force control unit 218 is a motor.

The drive force control units 216, 218 are each coupled to receive the actuator position commands supplied from one or more of the controllers 122 and, upon receipt of the commands, controls the drive force that is supplied to the actuators 206, 208. More specifically, the first drive force control unit 216, in response to actuator position commands, controls the drive force supplied to the first actuator 206 by controlling hydraulic fluid through the first actuator. The second drive force unit 218, in response to actuator position commands, controls drive force supplied to the second actuator 208 by rotating in a commanded direction and at a commanded rotational speed. It will be appreciated that the first drive force control unit 216 may be implemented as any one of numerous types of control valves, and that the second drive force control unit 218 may be implemented as any one of numerous types of motors. A non-limiting example of an embodiment of the first drive force control unit 216 is an electro-hydraulic servo valve (EHSV), and a non-limiting example of the second drive force control unit 218 is a DC motor.

As noted above, the second actuator 208 is coupled at one end to the pivot arm 212. The pivot arm 212 is in turn coupled to a static airframe structure 215. In the depicted embodiment, the pivot arm 212 includes a first pivot point 222 and a second pivot point 220. The first pivot point 222 is coupled to, and is configured to pivot relative to, the second actuator 208. The second pivot point 220 is coupled to the airframe structure 215 via, for example, a suitable bearing assembly 226 (see FIG. 3), and is thus configured to pivot relative to the airframe structure 215. However, as FIGS. 2 and 3 further show, the actuator assembly 126 further includes a pivot arm lock 224 that is configured to selectively lock the pivot arm 212, preferably at the second pivot point 220, and thereby prevent pivot arm 212 rotation.

The pivot arm lock 224 is coupled to receive lock commands and, in response, moves between a locked position and an unlocked position. In the locked position, the pivot arm lock 224 engages, or locks, the pivot arm 212, preventing the pivot arm 212 from pivoting relative to the airframe structure 215. Conversely, when the pivot arm lock 224 is in the unlocked position, it disengages, or unlocks, the pivot arm 212, allowing the pivot arm 212 to pivot relative to the airframe structure 215.

The lock commands are supplied to the pivot arm lock 224 from one or more of the system controllers 122-1, 122-2.

More particularly, if one or more of the system controllers 122-1, 122-2 determines that the flight control surface actuator assembly 126 is partially inoperable, and more specifically, that the second actuator 208 is inoperable, the system controllers 122-1, 122-2 supply an unlock command. It will be appreciated that the pivot arm lock commands supplied by the system controllers 122-1, 122-2 may be implemented according to any one of numerous paradigms, which may depend, for example, on how the pivot lock 224 is physically implemented. For example, a lock command and an unlock command could each be implemented as non-zero voltages of differing magnitudes and/or polarities that are supplied to the pivot lock 224. Alternatively, the lock command could be implemented as a non-zero voltage, while the unlock command could be implemented as the removal of voltage from the pivot lock 224, or vice-versa. In a particular preferred embodiment, the pivot lock 224 is implemented as a dual-coil, solenoid lock that, No matter the particular lock command paradigm that is used, during normal aircraft flight control surface actuation system 120 operation, when both actuators 206, 208 are operable, the pivot arm lock 224 is commanded to the locked position. However, in the unlikely event the second actuator 208 were to become inoperable, the pivot arm lock 224 is commanded to the unlocked position and the first actuator 206 can move the flight control surface to the commanded position. For example, if the second actuator 208 became inoperable while in the extended or retracted position, with the pivot arm 212 unlocked and allowed to rotate, the first actuator 206 can be positioned to a retracted or extended actuator position, respectively, to compensate for the inoperable second actuator 208.

It will be appreciated that the redundant actuator assembly 126 is not limited to compensating for the second actuator 208 becoming inoperable in an extended or retracted position. Indeed, the redundant actuator assembly 126 is configured such that the first actuator 206 will compensate for the second actuator 208 becoming inoperable in any position to bring the flight control surface 202 to a commanded position. Thus, the aircraft 100 can be adequately controlled until the inoperable actuator 208 is once again operable. It will additionally be appreciated that the redundant actuator assembly 126 could be configured such that the pivot arm 212 does not wholly restore the full range of movement of the flight control surface 202 in the event of an inoperable second actuator 208. In such a configuration, however, the redundant actuator assembly 126 is configured to at least allow the flight control surface 202 to be brought to a neutral position so that it will not interfere with the effect of other flight control surfaces on the aircraft.

The flight control surface actuation system 120 described herein is preferably implemented according to an active/active control scheme. With an active/active control scheme, the first and second actuators 206, 208 are both active during normal system 120 operation. If one or both of the controllers 122-1, 122-2 determines that the second actuator 208 has become inoperable, it will inactivate the second actuator 208 and supply actuator position commands only to the operable first actuator 206 in that actuator assembly 126. Alternatively, the system 120 could be implemented according to an active/inactive control scheme. With this control scheme, only second actuator 208 is active and the first actuator 206 is inactive during normal system 120 operation. If one or both controllers 122-1, 122-2 determines that the second actuator 208 has become inoperable, then second actuator 208 is inactivated and the first actuator 206 becomes fully active.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A flight control surface actuation system, comprising:
   a first flight control surface actuator adapted to couple to a flight control surface and a static airframe structure, the first flight control surface actuator further adapted to receive a drive force and operable, upon receipt thereof, to move between at least an extended position and a retracted position;
   a second flight control surface actuator adapted to couple to the flight control surface, the second flight control surface actuator further adapted to receive a drive force and operable, upon receipt thereof, to move between at least an extended position and a retracted position;
   a pivot arm rotationally coupled to, and configured to pivot relative to, the second flight control surface actuator, and directly rotationally mounted on, and configured to pivot relative to, the static airframe structure; and
   a pivot arm lock movable between a locked position, in which the pivot arm lock prevents rotation of the pivot arm, and an unlocked position, in which the pivot arm lock does not prevent rotation of the pivot arm.

2. The actuator assembly of claim 1, wherein:
   the pivot arm includes a first pivot point and a second pivot point;
   the pivot arm is adapted to be rotationally coupled to the static airframe structure at the first pivot point; and
   the pivot arm is directly rotationally mounted on the second flight control surface actuator at the second pivot point.

3. The actuator assembly of claim 1, wherein:
   the first actuator comprises a hydraulic actuator; and
   the second actuator comprises an electromechanical actuator.

4. The actuator assembly of claim 1, further comprising:
   first and second drive force control mechanisms, the first and second drive force control mechanisms adapted to receive actuator position commands and operable, upon receipt thereof, to control the drive force supplied to the first and second actuators, respectively.

5. The system of claim 4, wherein:
   the first actuator comprises a hydraulic actuator;
   the first drive force control unit comprises a hydraulic fluid control valve;
   the second actuator comprises an electromechanical actuator; and
   the second drive force control unit comprises a motor.

6. A flight control surface actuation system, comprising:
   a movably mounted flight control surface;
   a first flight control surface actuator coupled to the flight control surface and a static airframe structure, the first flight control surface actuator adapted to receive a drive force and operable, upon receipt thereof, to move the flight control surface between at least an extended position and a retracted position;

a second flight control surface actuator coupled to the flight control surface, the second flight control surface actuator adapted to receive a drive force and operable, upon receipt thereof, to move the flight control surface between at least an extended position and a retracted position; and a pivot arm rotationally coupled to, and configured to pivot relative to, the second flight control surface actuator and directly rotationally mounted on, and configured to pivot relative to, the static airframe structure.

7. The system of claim 6, wherein:
the pivot arm includes a first pivot point and a second pivot point;
the pivot arm is directly rotationally mounted on the static airframe structure at the first pivot point; and
the pivot arm is rotationally coupled to the second flight control surface actuator at the second pivot point.

8. The system of claim 6, further comprising:
a pivot arm lock movable between a locked position, in which the pivot arm lock prevents rotation of the pivot arm, and an unlocked position, in which the pivot arm lock does not prevent rotation of the pivot arm.

9. The system of claim 6, wherein:
the first actuator comprises a hydraulic actuator; and
the second actuator comprises an electromechanical actuator.

10. The system of claim 6, further comprising:
an actuator controller adapted to receive flight control surface position commands and operable, in response thereto, to supply actuator position commands; and
first and second drive force control mechanisms, the first and second drive force control mechanisms adapted to receive actuator position commands and operable, upon receipt thereof, to control the drive force supplied to the first and second actuators, respectively.

11. The system of claim 10, wherein:
the first actuator comprises a hydraulic actuator;
the first drive force control unit comprises a hydraulic fluid control valve;
the second actuator comprises an electromechanical actuator; and
the second drive force control unit comprises a motor.

12. The system of claim 10, wherein:
the controller is further coupled to receive one or more signals representative of first and second actuator operability and is further operable, in response thereto, to determine if one or both of the first and second actuators are operable;
the controller is configured to supply actuator position commands to both the first and second drive force control units if both the first and second actuators are determined to be operable; and
the controller is configured to supply actuator position commands to only one of the first and second drive force control units if only the first actuator is determined to be operable.

13. The system of claim 10, wherein the controller is further configured to supply lock commands and wherein the system further comprises:
a pivot arm lock coupled to receive the lock commands and operable, upon receipt thereof, to move between a locked position, in which the pivot arm lock prevents rotation of the pivot arm and, and an unlocked position, in which the pivot arm lock does not prevent rotation of the pivot arm.

14. A flight control surface actuation system, comprising:
an actuator controller adapted to receive flight control surface position commands and operable, in response thereto, to supply actuator position commands;
a first drive force control unit coupled to receive the actuator position commands and operable, upon receipt thereof, to supply a first drive force;
a second drive force control unit coupled to receive the actuator position commands and operable, upon receipt thereof, to supply a second drive force;
a first flight control surface actuator adapted to couple to a flight control surface and a static airframe structure, the first flight control surface actuator coupled to receive the first drive force and operable, upon receipt thereof, to move between at least an extended position and a retracted position;
a second flight control surface actuator adapted to coupled to the flight control surface, the second flight control surface actuator adapted to receive the second drive force and operable, upon receipt thereof, to move between at least an extended position and a retracted position;
a pivot arm rotationally coupled to, and configured to pivot relative to, the second flight control surface actuator, and directly rotationally mounted on, and configured to pivot relative to, the static airframe structure; and
a pivot arm lock movable between a locked position, in which the pivot arm lock prevents rotation of the pivot arm, and an unlocked position, in which the pivot arm lock does not prevent rotation of the pivot arm.

15. The system of claim 14, wherein:
the pivot arm includes a first pivot point and a second pivot point;
the pivot arm is adapted to be directly rotationally mounted on the static airframe structure at the first pivot point; and
the pivot arm is rotationally coupled to the second flight control surface actuator at the second pivot point.

16. The system of claim 14, wherein:
the first actuator comprises a hydraulic actuator;
the first drive force control unit comprises a hydraulic fluid control valve;
the second actuator comprises an electromechanical actuator; and
the second drive force control unit comprises a motor.

17. The system of claim 14, wherein:
the controller is further coupled to receive one or more signals representative of first and second actuator operability and is further operable, in response thereto, to determine if one or both of the first and second actuators are operable;
the controller is configured to supply actuator position commands to both the first and second drive force control units if both the first and second actuators are determined to be operable; and
the controller is configured to supply actuator position commands to only one of the first and second drive force control units if only the first actuator is determined to be operable.

18. The system of claim 14, wherein:
the controller is further configured to supply lock commands and
the pivot arm lock is coupled to receive the lock commands and is operable, upon receipt thereof, to move between the locked positions and the unlocked positions.

* * * * *

UNITED STATES PATENT AND TRADEMARK OFFICE
CERTIFICATE OF CORRECTION

PATENT NO. : 7,607,611 B2
APPLICATION NO. : 11/192625
DATED : October 27, 2009
INVENTOR(S) : Wingett et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 317 days.

Signed and Sealed this

Twelfth Day of October, 2010

David J. Kappos
*Director of the United States Patent and Trademark Office*